US012052801B2

(12) United States Patent
Hort et al.

(10) Patent No.: US 12,052,801 B2
(45) Date of Patent: Jul. 30, 2024

(54) PTC ELECTRIC HEATING DEVICE

(71) Applicant: Eberspächer catem GmbH & Co. KG, Herxheim (DE)

(72) Inventors: Sascha Hort, Karlsruhe (DE); Michael Niederer, Kapellen-Drusweiler (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 618 days.

(21) Appl. No.: 16/985,729

(22) Filed: Aug. 5, 2020

(65) Prior Publication Data

US 2021/0045194 A1 Feb. 11, 2021

(30) Foreign Application Priority Data

Aug. 6, 2019 (DE) ......................... 102019211795.3

(51) Int. Cl.
*H05B 1/02* (2006.01)
*H05B 3/00* (2006.01)
*H05B 3/06* (2006.01)

(52) U.S. Cl.
CPC ......... *H05B 1/0294* (2013.01); *H05B 3/0019* (2013.01); *H05B 3/06* (2013.01); *H05B 2203/017* (2013.01); *H05B 2203/02* (2013.01)

(58) Field of Classification Search
CPC ...... H05B 1/0294; H05B 3/0019; H05B 3/06; H05B 2203/017; H05B 2203/02
See application file for complete search history.

(56) References Cited

U.S. PATENT DOCUMENTS

| | | | |
|---|---|---|---|
| 8,637,796 B2 | 1/2014 | Bohlender | |
| 8,946,599 B2 | 2/2015 | Niederer et al. | |
| 9,915,441 B2 | 3/2018 | Kohl et al. | |
| 10,429,099 B2 | 10/2019 | Bohlender et al. | |
| 2008/0015805 A1 | 1/2008 | Kusano | |
| 2008/0173637 A1 | 7/2008 | Taguchi | |
| 2012/0085743 A1 | 4/2012 | Clauss et al. | |

(Continued)

FOREIGN PATENT DOCUMENTS

| | | |
|---|---|---|
| DE | 102004043699 A1 | 6/2005 |
| DE | 10 2011 054 406 | 4/2013 |

(Continued)

*Primary Examiner* — Nathaniel E Wiehe
*Assistant Examiner* — Keith Brian Assante
(74) *Attorney, Agent, or Firm* — Boyle Fredrickson S.C.

(57) ABSTRACT

An electric heating device a housing with a partition wall which separates a connection chamber from a heating chamber for dissipating heat and from which at least one PTC heating element with a heating element casing protrudes in the direction toward the heating chamber. At least one PTC element and conductor tracks, electrically connected in the connection chamber for energizing the PTC element with different polarities and connected to the PTC element in an electrically conductive manner, are supported in the heating element casing an insulated manner. For improved support of the PTC heating element, a holding element, engaging around the heating element casing, is connected to the partition wall on its side facing the heating chamber and is connected to the heating element casing. Also disclosed is a method for the manufacture of such an electric heating device.

15 Claims, 3 Drawing Sheets

(56) References Cited

U.S. PATENT DOCUMENTS

| | | | | |
|---|---|---|---|---|
| 2013/0161308 | A1* | 6/2013 | Bohlender | B60H 1/2225 219/202 |
| 2015/0215994 | A1* | 7/2015 | Bohlender | B32B 37/18 156/60 |
| 2018/0015805 | A1 | 1/2018 | Gschwind | |
| 2018/0037089 | A1* | 2/2018 | Baek | B60H 1/2221 |
| 2018/0156494 | A1* | 6/2018 | Bohlender | F24H 9/1872 |

FOREIGN PATENT DOCUMENTS

| | | | |
|---|---|---|---|
| DE | 10 2011 054406 | | 5/2013 |
| EP | 1 872 986 | | 1/2008 |
| EP | 2 337 425 | | 6/2011 |
| EP | 2505931 | A1 | 10/2012 |
| EP | 2 796 804 | | 10/2014 |
| EP | 3334242 | A1 | 6/2018 |
| EP | 3493650 | A1 | 6/2019 |
| EP | 3772867 | | 2/2021 |

* cited by examiner

PTC ELECTRIC HEATING DEVICE

BACKGROUND OF THE INVENTION

1. Field of the Invention

The present invention relates to an electric heating device with a housing comprising a partition wall, which separates a connection chamber from a heating chamber for dissipating heat. At least one PTC element protrudes from the partition wall in the direction towards the heating chamber. This PTC heating element is exposed in the heating chamber in the manner of a heating rib. The PTC heating element has at least one PTC element and conductor tracks connected thereto in an electrically conductive manner which are associated with different polarities for energizing the PTC element. These conductor tracks are electrically connected to the power current in the connection chamber.

2. Background of the Invention

Such an electric heating device is known, for example, from EP 1 872 986 A1 or EP 2 337 425 A1. Another also generic electric heating device is known from EP 3 334 242 A1. In this prior art, the PTC heating element is first manufactured as a separate component and inserted as such into a heating element receptacle formed on the partition wall, so that the end of the heating element casing on the connection side is accommodated in a sealed manner in the heating element receptacle of the partition wall and the conductor tracks with their free ends on the connection side are exposed in the connection chamber in order to be electrically connected there.

In the prior art previously mentioned, the PTC heating element thus preassembled is held frictionally engaged in the heating element receptacle. For this purpose, the PTC heating element has a labyrinth seal that is formed by the heating element casing and that is pressed into the heating element receptacle.

According to the teaching of EP 3 334 242 A1, the attachment of the PTC heating element is to be suitable at least for the assembly of the individual components of the previously known electric heating device. After all components of the electric heating device have been installed, the PTC heating element on its underside opposite to the connection side is supported on a base which, in the example discussed above, closes off the heating chamber. The PTC heating element is then clamped between the base and the heating element receptacle and secured in its installed position.

SUMMARY

The present invention is based on the object of specifying an improved electric heating device of the kind mentioned above.

To satisfy this object, an electric heating device includes a housing with a partition wall which separates a connection chamber from a heating chamber for dissipating heat, at least one PTC heating element, with a heating element casing that protrudes in a direction toward the heating chamber. At least one PTC element and conductor tracks are supported in the heating element casing an insulated manner. The conductor tracks are electrically connected in the connection chamber for energizing the PTC element with different polarities. The conductor tracks are connected to the PTC element in an electrically conductive manner A holding element engages around the heating element casing. The holding element is connected to the partition wall on a side facing the heating chamber, and is connected to the heating element casing.

The holding element may have a receiving opening which typically surrounds the heating element casing circumferentially and which engages around the holding element in such a way that a mechanical connection between the heating element casing and the holding element is established. Such a connection is typically an at least force-fit or frictionally engaged connection. This provides the advantage that the heating element casing can first be joined, for example with the separately prepared housing, in particular, with the partition wall of the electric heating device during manufacture, for example, as a plugged connection, as is basically known from EP 3 334 242 A1, and by pushing the holding element onto the heating element casing, the heating element engages from the side of the heating chamber around the heating element casing. For this purpose, the holding element typically has holding projections abutting against the outer surface of the heating element casing, for example, in the form of resilient flexible tongues which interact with the outer surface of the heating element casing.

The holding element may be connected to the partition wall on its side facing the heating chamber. The holding element is also connected to the heating element casing, in particular by the previously mentioned force-fit or frictionally engaged connection. The holding element thus mechanically secures the heating element casing relative to the housing of the electric heating device and thus to the partition wall.

The present invention is also suitable for the mechanical attachment of heating elements which are connected differently to the housing of the electric heating device, and thus to its partition wall, than a plug contact according to EP 3 334 242 A1. With the holding element, the solution according to the invention provides an additional securing option for the heating element casing relative to the housing of the electric heating device even if the latter is formed integrally with the partition wall or is connected thereto in a positive substance-fit manner, for example, by welding.

However, the solution according to the invention has particular advantages in connection with plug-in heating element casings which are held in the partition wall or at least accommodated therein in a sealed manner and which are initially manufactured separately. This is for the reason that the holding element can mechanically attach such heating element casings permanently and reliably relative to the housing of the electric heating device and thus secure them. For this purpose, it is usually only necessary to push the holding element from the side of the heating chamber over the heating element casing and to connect it to the housing of the electric heating device.

The connection between the holding element and the heating element casing may be a force-fit connection. However, the holding element may also be connected in a force-fit manner to the partition wall and thus to the housing of the electric heating device. A sturdy mechanical connection can then be created by pushing the holding element on and abutting the holding element against the partition wall. This connection can be effected in that the holding element abutted against the partition wall is subsequently caulked or otherwise deformed and/or connected. However, the holding element may be connected to the housing of the heating device solely by abutting and pressing it against the partition wall. For example, the holding element only has to be pushed over the heating element casing and abutted with a certain contact pressure, for example, against the partition wall, in order to take the holding element to its installed position and thus mechanically connect it, firstly, to the heating element casing and, secondly, to the partition wall.

The solution according to the invention also provides the advantage that the holding element can interact as a shield with the heating element casing for connecting the latter electrically, for example, to a ground terminal or to ground which is provided via the housing of the electric heating device. For this purpose, the housing can be entirely or in part electrically conductive. It can also only hold and define a ground terminal to which the holding element is electrically connected in the installed position. The shield of the PTC element inside the heating element casing requires a heating element shield which is part of the heating element casing. Such a shield can be formed, for example, by an envelopment enclosing the PTC element. This envelopment can be an electrically conductive configuration, possibly made of metal, typically completely surrounding the PTC element. Such a configuration can be connected as a shielding grid to a plastic housing which joins the PTC heating element and the contact plates to form a unit, as is known from EP 3 334 242 A1.

Such an envelopment made of electrically conductive material surrounding the PTC element is known, for example, from US 2008/0173637 A1. In this prior art, the PTC element and the conductors tracks abutting thereagainst in an electrically conductive manner are each inserted with the interposition of an insulating layer into a tube with a rectangular cross-sectional area, the inner surface of which is abutted in a thermally conductive manner against the insulating layer and thus indirectly against one of the heat extraction surfaces of the PTC elements within the tube. Such a heating element also provides the option of forming an envelopment enclosing the PTC element. For this purpose, the heating rod does not necessarily have to be closed with a shielding element at its free lower end facing away from the partition wall, although such an element may be beneficial as a plug to form a complete envelopment.

The shield, however, can also be formed by a pocket which completely seals the at least one PTC element and the two conductor tracks and which is closed on its underside and also otherwise encloses the PTC element and the conductor tracks in a sealed manner, where electric contact strips, which are typically formed integrally from contact plates forming conductor tracks and protrude beyond the outside of the pocket.

Such a pocket can be formed, for example, from sheet metal material which is first prepared as a tube, then fitted with the PTC element and the conductor tracks, and then deformed such that heat extraction surfaces of the PTC element are in heat-conducting contact with inner surfaces of the pocket. In addition or alternatively, the pocket can also be filled with a thermally conductive mass, for example, a silicone mass, in order to connect the inner surface of the pocket to the heat-extraction surfaces of the PTC element in a manner as heat conductive as well as possible. It goes without saying that such a PTC element and the conductor tracks connected thereto in an electrically conductive manner are supported insulated within such a pocket which by itself is electrically conductive. For this purpose, the conductor tracks, the PTC element, and typically insulating layers abutting on both sides of the main side surfaces of the PTC element that are the largest side surfaces of the PTC element and accordingly form the relevant heat extraction surfaces, can be pre-assembled in a holder that is made of insulating material and that is inserted into the pocket. It is just as well possible to fit the pocket with the insulating layers and the contact plates forming the conductor tracks and to arrange the PTC element(s) between the conductor tracks, where the pocket may subsequently be deformed from the outside in order to abut the inner walls with good thermal conductivity with the interposition of the insulation layers and the conductor tracks against the heat extraction surfaces of the PTC element. Then the pocket may be filled with the thermally conductive mass.

In any case, the aforementioned pocket envelops the electrically conductive elements of the PTC heating element and, in addition, due to the metallic material of the pocket, provides an electrically shielding envelopment for the at least one PTC element within the pocket. The holding element engaging around this envelopment and being connected to the envelopment in an electrically conductive manner results in an external contact of the shield via the holding element, which in turn can be connected to a ground terminal which is associated with the partition wall or is formed thereby. For every individual heating element housing, only the typically two connection lugs of the two conductor tracks must be electrically connected in the connection chamber for each heating element. In particular with several PTC heating elements, a simplified connection of the former to the shield arises by pushing the holding element onto all heating element casings. For this purpose, they may be of identical design and accordingly protrude by the same length from the typically planar partition wall.

The aforementioned shield may also extend over the connection chamber which for this purpose has a connection chamber shield that shields this connection chamber electromagnetically. This shield can be formed in that the housing parts forming the connection chamber are manufactured from electrically conductive material, in particular from metal. For this purpose, the partition wall can be integrally formed on the connection chamber side with an edge which is provided with a metallic housing cover to the connection chamber, as is known, for example, from EP 3 334 242 A1, in order to also seal the connection chamber, so that no moisture and no contamination can enter the connection chamber.

The partition wall and parts of the housing can just as well be made of plastic material with a shield connected thereto. The shield can be arranged in the plastic housing by injection mold coating. Various options are known to the person skilled in the art to provide the connection chamber and/or the partition wall with an electromagnetic effective shield. This shield is connected in an electrically conductive manner to the holding element, so that the shield extends from the heating elements over the holding element to the connection chamber shield. This provides effective EMC protection for the electric heating device.

For simple electrical contact of the shielding envelopment to the holding element, the housing comprises at least one locking projection surrounding the holding element on the outside. This locking projection is typically formed integrally by the housing forming the partition wall. The holding element has a housing connection strip which abuts against the locking projection under preload. The configuration may be selected such that, after the holding element has been pushed onto the heating element casing of the holding element, it is also electrically connected to the housing via the housing connection strips. The housing connection strip there typically abuts against a surface of the locking projection under resilient preload, the housing connection strip usually scratches along the respective surface when the holding element is pushed onto the heating element casing. With regard to the best possible electrical contact, several locking projections formed by the housing and several housing connection strips associated therewith are usually provided. In addition, t the holding element may connect not only in a force-fit manner, but also in a positive-fit manner to the partition wall or the housing that forms the partition wall, respectively. For example, the holding element and the housing may have mutually associated functional surfaces which interact in such a way that the holding element is held in its installed position in a predetermined arrangement and orientation relative to the partition wall or the housing, respectively.

For this purpose, for example, the partition wall can form a collar which may surrounds the at least one heating element casing. According to aa development, the holding element engages around this collar. For example, the holding element has an edge that is circumferential at least in sections and which is at least configured such that it interacts with the collar on oppositely disposed sides and engages therearound. This provides positive-fit positioning of the holding element relative to the partition wall. The edge may run around the entire circumference of the holding element and interacts with a collar that is also formed fully circumferentially.

According to a development of the present invention, the holding element is formed by an integrally formed sheet metal element This sheet metal element forms the receiving opening previously described. The edge discussed above may also be formed on the sheet metal element in a bending and punching process. Nevertheless, the holding element may be substantially planar and need not extend in the vertical direction of the PTC heating element or only slightly. At least one, and possibly several, contact strips are provided by punching and bending which are exposed in the receiving opening and bear against the heating element casing under resilient preload. The contact strip differs from the spring segment in that the former also causes the electric contact to the outer surface to create a shield. The contact strips typically protrude from the receiving opening from the plane of the sheet metal element in the direction toward the lower end of the heating element casing. When the holding element is pushed onto the heating element casing, the contact strips then flex in the opposite direction to the pushing-on direction and abut resiliently against the outer surface of the heating element casing.

The present invention provides a method for the manufacture of an electric heating device in which first a housing with a partition wall which separates a connection chamber from a heating chamber for dissipating heat, and at least one PTC heating element with at least one heating element casing are manufactured, in which heating element casing at least one PTC heating element and conductor tracks are supported in an insulated manner, with the conductor tracks being arranged for energizing the PTC element with different polarities, and with the conductor tracks being connected to the PTC element in an electrically conductive manner. The method includes introducing the PTC heating element into a heating element receptacle of the partition wall so that the heating element protrudes from the partition wall in a direction towards the heating chamber, an pushing a holding element, interacting with the heating element casing, over the heating element casing, and connecting the holding element to the partition wall on side thereof facing the heating chamber.

When the holding element is pushed on over the heating element casing, there is usually a frictionally engaging connection between these two elements which had been manufactured separately beforehand and are joined to one another only after the heating element casing has been joined with the partition wall. The heating element casing(s) is/are typically first secured to the partition wall via the holding element before electric connection elements of the conductor tracks, for example connection lugs, which are formed integrally by contact plates to the individual PTC elements, are electrically connected in the region of the connection chamber. A base element, as is known from EP 3 334 242 A1, can previously have been connected to the housing forming the partition wall in order to form the heating chamber as a substantially circumferentially closed circulation chamber, each with an inlet and outlet port for the typically liquid medium to be heated. The heating element casing of each individual PTC heating element is exposed in this circulation chamber in the manner of a heating rib.

BRIEF DESCRIPTION OF THE DRAWINGS

Further details and advantages of the present invention shall become apparent from the following description of an embodiment in combination with the drawing, in which:

FIG. 2 shows a perspective side view of a housing which forms a partition wall and which is fitted several PTC heating elements before the holding element is pushed on;

FIG. 3 shows a representation according to FIG. 2 after the holding element has been pushed on;

DETAILED DESCRIPTION

Figure 1:
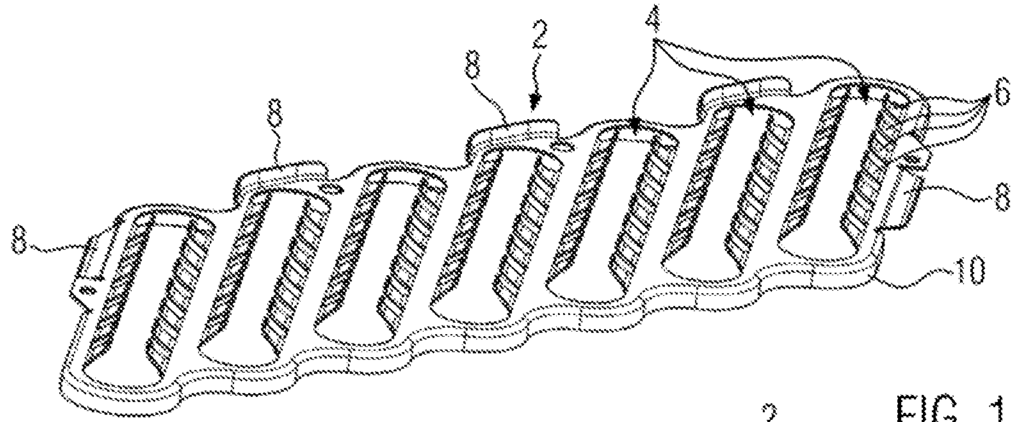
FIG. 1 shows a perspective side view of an embodiment of a holding element.

FIG. 1 shows an embodiment of a holding element 2 formed by punching and bending which comprises a plurality of receiving openings 4 which extend parallel to one another and are designed as an elongated hole into which contact strips 6 respectively protrude on oppositely disposed longitudinal sides of the receiving openings 4. Housing connection strips 8 are provided on the rear longitudinal edge of the holding element 2 in FIG. 1. Three housing connection strips 8 are presently provided there. Located on oppositely disposed transverse sides of the holding element 2, the base area of which is configured as a parallelogram, is a further housing connection strip 8.

The holding element 2 is formed by punching and bending sheet metal material. The housing connection strips 8 and the contact strips 6 protrude from one side of the planar sheet metal material, whereas a fully circumferentially closed circumferential edge 10 protrudes from the other side and is formed from the plane of the sheet metal material by bending the same.

Figure 4:
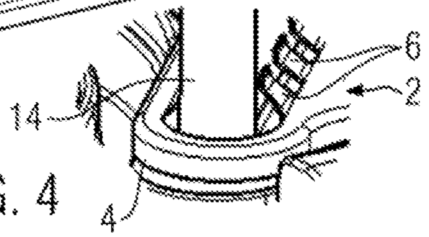
FIG. 4 shows detail D according to FIG. 3 in an enlarged view.

As can be seen in particular from FIG. 4, the contact strips 6 have an end on the attachment side which is connected to the edge of the receiving opening 4 and projects therefrom, and a free end which is opposite a web-shaped section which is bent again obliquely from the plane of the sheet metal material and extends substantially at a right angle to the plane of the sheet metal material. The free end of the contact strip 6 can terminate with a sharp edge.

The holding element 2 can be formed from brass, steel, copper or aluminum. A material should be selected which, firstly, exhibits good electrical conductivity and, secondly, has a certain spring rigidity so that the contact strips can abut against the heating element casing with good contact pressure.

Figure 2:
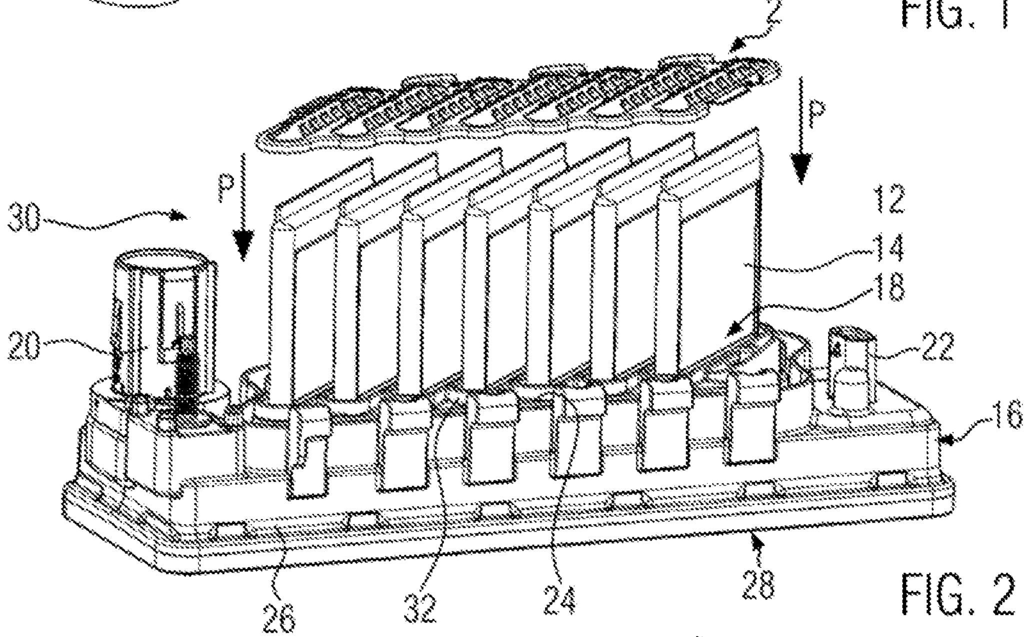

The PTC heating elements are identified in FIG. 2 with reference numeral 12. They have a heating element casing 14 which is formed from sheet metal and fully circumferentially encloses electrically conductive conductor tracks in the form of contact plates which are typically contacted to mutually oppositely disposed side surfaces of a PTC element, likewise not shown. Details of such a configuration can be gathered from EP 3 334 242 A1. There is also an insulation within the heating element casing 14 which prevents the contact plates from electrically contacting the inner surface of the heating element casing 14. Because the sheet metal material forming the heating element casing 14 is electrically conductive and forms a circumferential envelopment that shields the PTC element circumferentially. The PTC element and the contact plates are also encapsulated by this envelopment from the medium to be heated, and separated according to which flows against the outside of the heating element casing for heating purposes in order to absorb and dissipate the heat generated by the PTC element. The PTC heating elements protrude from a housing 16 which forms a heating element receptacle 18 for each PTC heating element 12. The end of the PTC heating element 12 on the connection side is inserted into this heating element receptacle 18. For this purpose, the heating element casing 14 is typically provided on its outer circumference with a circumferential seal which abuts in a sealed manner against the walls of the housing 16 defining the heating element receptacle, cf. EP 3 334 242 A1.

The housing 16 can be a metal pressure die-cast housing. To form a connection chamber shield, the housing 16 can equally well be an injection-molded plastic housing into which a shield is incorporated or connected to the plastic housing, for example, by way of injection mold coating with the plastic material. Connected to the housing 16 at diagonally opposite corners of the housing 16, which is basically formed with a rectangular base area, is, firstly, a connector casing 20 for the power current and, secondly, a connector casing 22 for control signals. The two connector casings 20, 22 are made of plastic material and are connected to the housing 16 with the interposition of a seal.

The housing 16 is basically bowl-shaped, where a base of the bowl forms a partition wall 24 in which the heating element receptacles 18 are recessed. This partition wall 24 is circumferentially surrounded by a circumferential housing wall 26 which encloses a receiving chamber. Exposed in this connection chamber identified by reference numeral 28 are the respective contact plates of the individual PTC heating elements 12 for the electrical connection to the power current. The connection chamber 28 typically also accommodates a control device which controls all the PTC heating elements and, possibly, groups them into different heating circuits.

A heating chamber is indicated with reference numeral 30 on the side of the partition wall 24 opposite the connection chamber 28. In the embodiment shown, this heating chamber 30 is completed by a further housing element, not shown, which encloses all the PTC heating elements 12, with the exclusion of the connector casings 20, 22, and comprises a base so that a circulation chamber is formed as a heating chamber which is accessible via inlet and outlet ports from the outside for circulating a medium to be heated in the circulation chamber and to pass it along the surfaces of the PTC heating elements 12 in order to heat the medium.

The holding element 2 according to FIG. 1 is provided in FIG. 2 as an extension of the free ends of the PTC heating elements 12. The direction line P indicates the assembly direction. The holding element 2 is then pushed over the individual heating element casings 14. The contact strips 6 there abut against the outer surface of the heating element casings 14 and contact them electrically. They scrape against the outer surface of the heating element casing 14 when the holding element is mounted.

Figure 3:
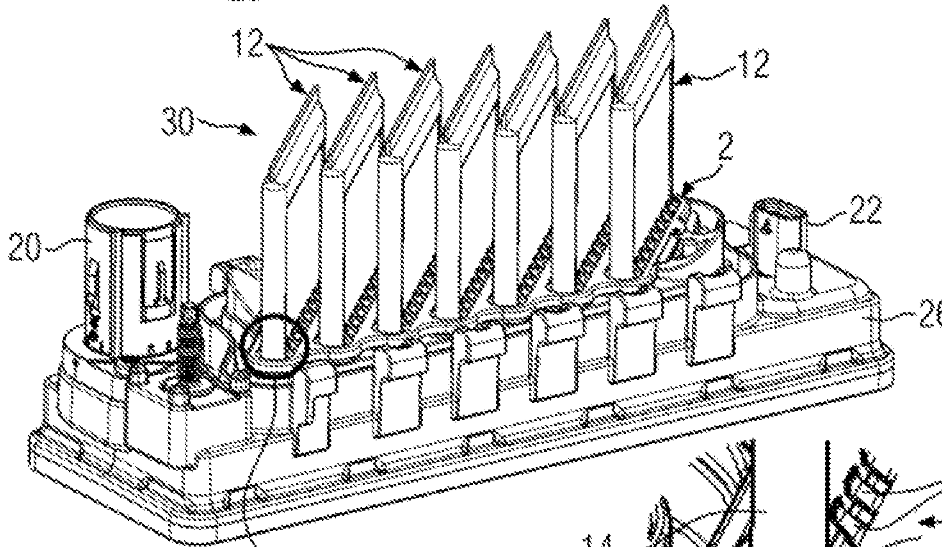

FIG. 3 shows the installation position of the holding element 2. In the installed position, this holding element 2 engages with its edge 10 around a collar that surrounds the partition wall 24 circumferentially and is identified with reference numeral 32 in FIG. 2. As a result, the holding element 2 is positioned relative to the partition wall 24 and therefore to the housing 16. In this installed position, the contact strips 6 provided on the oppositely disposed longitudinal sides of the elongated holes each contact the oppositely disposed main side surfaces of the heating element casings 14. This then results in electrical contact between these heating element casings 14 and the holding element 2, which can also be effected in a positive-fit manner with the contact strip 6 tapering sharply.

Figure 5:
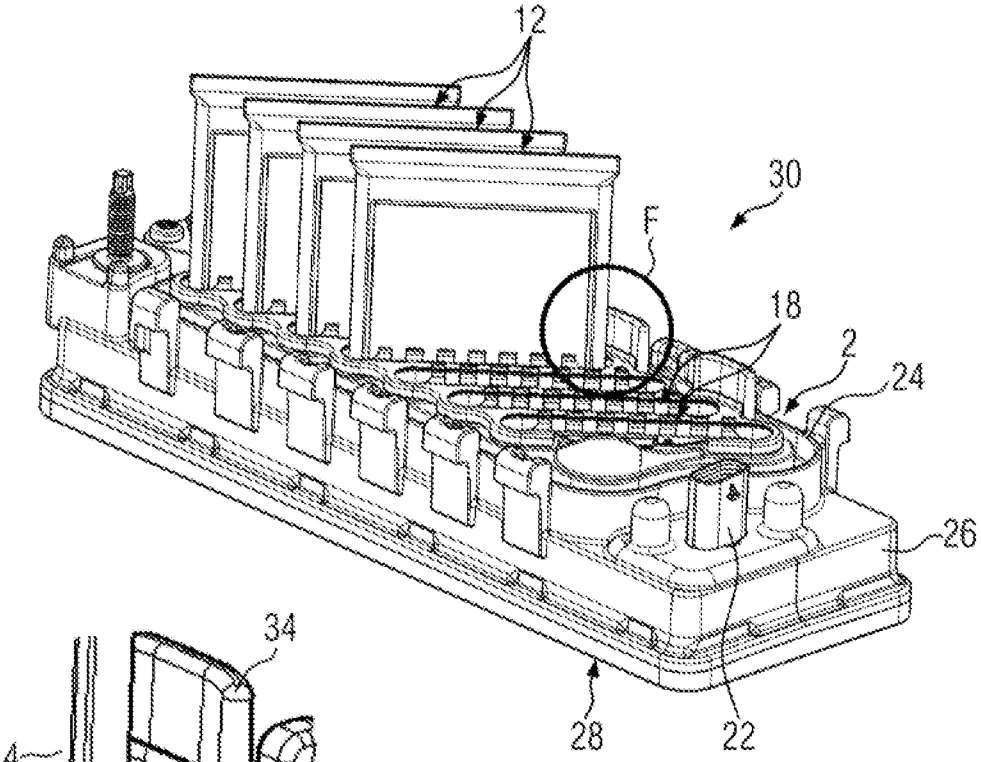
FIG. 5 shows a perspective side view after the holding element has been pushed on, where some of the heating elements have been removed for better illustration of the situation.
Figure 6:
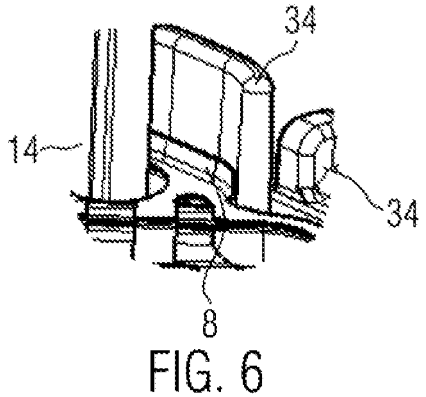
FIG. 6 shows detail F according to FIG. 5 in an enlarged view.

FIGS. 5 and 6 in particular show that the housing 16 has several locking projections 34 which protrude from the partition wall 24 in the direction toward the heating chamber 30 and which presently are formed integrally with the pressure die-cast housing. The housing connection strips 8 abut against these locking projections 34 in an electrically conductive manner. When the holding element 2 is pushed on, the housing connection strips 8 scrape along the surface of the locking projections 34 so that, firstly, a positive-fit, sometimes also a clawing and therefore force-fit connection arises which also establishes electrical contact between the holding element 2 and the housing 16.

A force-fit and/or positive-fit connection arises between the holding element 2 and the housing 16 due to, firstly, the circumferential edge 10 of the holding element 2 engaging around the collar 32 projecting from the partition wall 24 in the direction toward the connection chamber 28 and, secondly, the locking projections 34 interacting with the housing connection strips 8. This connection is also electrically conductive. The connection between the holding element 2 and the heating element casing 14 is also electrically conductive. The electrically conductive properties of the housing 16 give rise to a circumferential shield which accommodates the PTC elements of the PTC heating elements 12 and circumferentially surrounds the connection ends of the contact strips for the electrical connection of the PTC elements in the region of the connection chamber 28. Once a cover for the connection chamber 28 is mounted, all current-carrying components of the embodiment are shielded electromagnetically.

The electrical connections required for this can be established simply by pressing the holding element 2, firstly, onto the heating element casing 14 and, secondly, onto the housing 16. No further fastening devices or the like are required for firmly connecting the holding element 2 to the housing 16.

Figure 7:
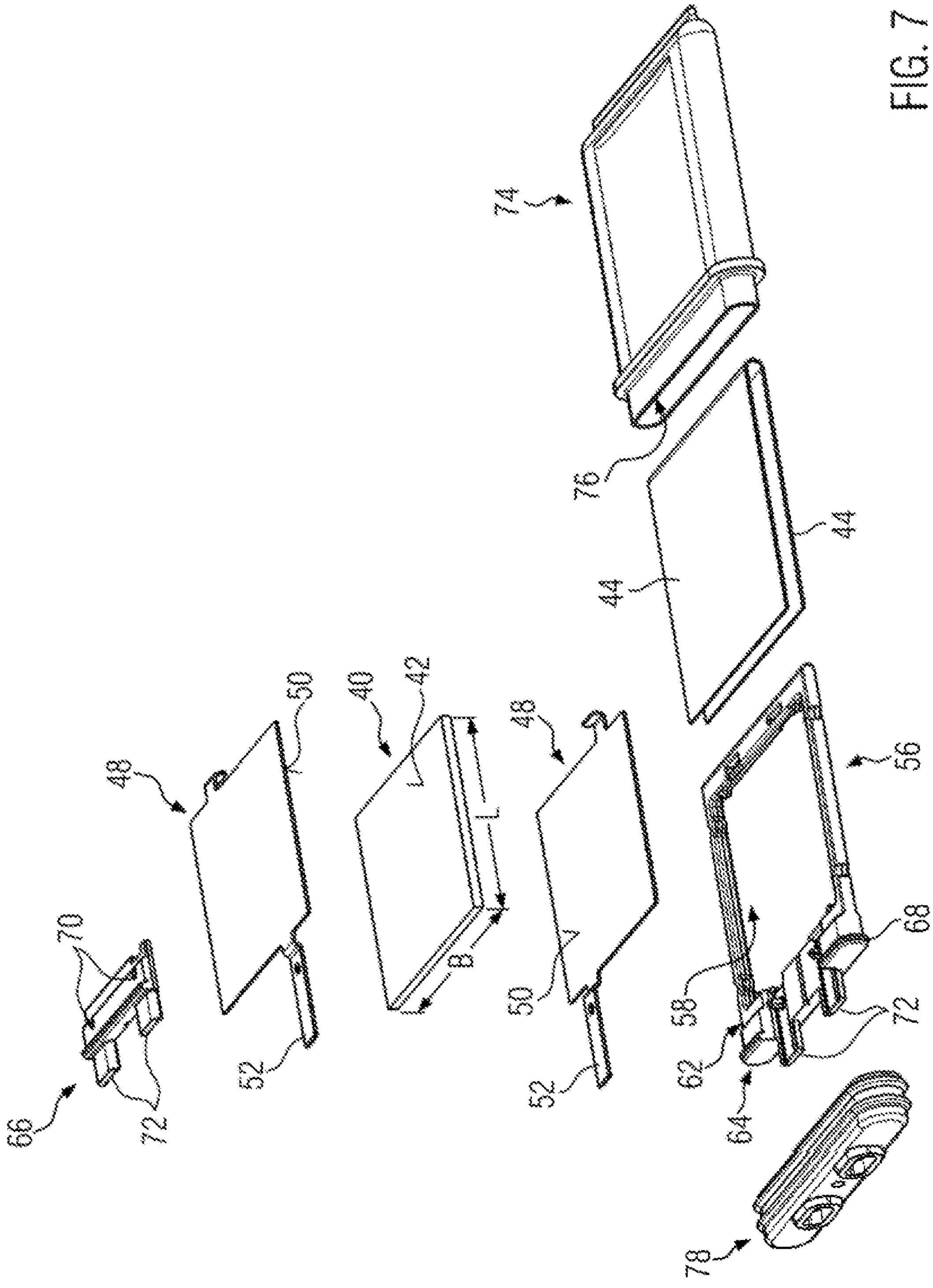
FIG. 7 shows a perspective explosion view of the PTC heating element of the embodiment.

FIG. 7 illustrates details of the PTC heating element 12 which presently comprises only one PTC element 40 which at its oppositely disposed main side surfaces 42 is covered with an insulating layer 44. The insulating layers 44 are presently formed from a plastic film, for example made of Kapton. The PTC element 40 is configured as a platelet having a width B or a length L, respectively, that is greater by the factor of at least 10 than a thickness that corresponds to the distance between the two main side surfaces 42. Provided on oppositely disposed main side surfaces 42 are metal sheet contact plates defining conductor tracks 48 in the meaning of the invention which conductor tracks 48 can be adhesively bonded to the PTC element 40 and thereby be connected in an electrically conductive manner to a surface metallization of the ceramic PTC element 40 which can be applied as a layer by way of PVD or CVD. The conductor tracks 48 can also only merely be placed onto the PTC element 40. Each conductor track 48 forms a contact surface 50 which is abutted in an electrically conductive manner against the main side surface 42 of the PTC element 40 and a contact strip 52 projecting on one side above the PTC element 40. The contact surface 50 is presently provided coinciding with the main side surface 42 of the PTC element 40. The insulating layer 44 lies on the side facing away from the PTC element 40 on the contact plate 48 and covers the latter.

The PTC element 40 is received in a frame 56 which for this purpose comprises a frame opening 58. An upper cross tie member 62 of said frame 56 is formed integrally with a passage element base 68 which together with a passage segment lid 66 forms a kind of plug over which a stop collar 68 projects. The passage segment lid 66 comprises bores 70 and half shells 72 that are aligned with them and the passage element base 64 sandwich the contact strips 52.

After assembly, the contact strips 52 of each conductor tracks 48 projects the upper cross tie member 62. The unit thus produced is inserted into a deep-drawn part marked with reference numeral 74 which is formed from sheet metal by deep drawing and provided with a single opening 76, which opening is surrounded by a seal element 78 overmolded over the frame 56. The contact strips 52 are provided for plug connection within the connection chamber 28. The seal element 78 is sealingly received in the heating element receptacle 18.

We claim:

1. An electric heating device comprising:

a housing with a partition wall which separates a connection chamber from a heating chamber for dissipating heat;

at least one PTC heating element having a heating element casing that protrudes in a direction toward the heating chamber, the at least one PTC heating element held in a sealing manner within the partition wall by a sealing element;

at least one PTC element and conductor tracks supported in the heating element casing an insulated manner, wherein the conductor tracks are electrically connected in the connection chamber for energizing the PTC element with different polarities, and wherein the conductor tracks are connected to the PTC element in an electrically conductive manner; and a holding element connected to a side of the partition wall facing the heating chamber, the holding element having at least one receiving opening surrounding the heating element casing of a respective at least one PTC heating element;

wherein the housing include a collar projecting from the partition wall, and wherein the holding element includes a circumferential edge that engages around the collar.

2. The electric heating device according to claim 1, wherein the holding element is connected, at least in a force-fit manner, to the partition wall.

3. The electric heating device according to claim 1, wherein the holding element is connected, at least in a force-fit manner, to the heating element casing.

4. The electric heating device according to claim 1, wherein the holding element is connected, at least in a force-fit manner, to the partition wall and the heating element casing.

5. The electric heating device according to claim 1, wherein the heating element casing comprises a heating element shield that shields the PTC element electromagnetically, and wherein the heating element shield is electrically connected to the holding element.

6. The electric heating device according to claim 5, wherein the heating element shield is formed by an envelopment enclosing the PTC element.

7. The electric heating device according to claim 6, wherein the connection chamber is provided with a connection chamber shield that shields the connection chamber electromagnetically and that is electrically conductively connected to the holding element.

8. The electric heating device according to claim 2, wherein the holding element includes at least one connection strip, wherein the housing includes at least one locking projection protruding from the partition wall toward the heating chamber, and wherein the at least one connection strip abuts against the at least one locking projection under preload to connect the holding element to the partition wall in a force-fit manner is connected, at least in a force-fit manner, to the partition wall.

9. The electric heating device according to claim 8, wherein the housing connection strip abuts, in an electrically conductive manner, against the locking projection.

10. The electric heating device according to claim 9, wherein the partition wall forms a collar which circumferentially surrounds the at least one heating element casing and which has the holding element engaging around it.

11. The electric heating device according to claim 9, wherein the holding element is an integrally formed sheet metal element that is punch-processed to form the at least one receiving opening for the heating element.

12. The electric heating device according to claim 11, wherein the holding element is substantially planar.

13. The electric heating device according to claim 11, wherein the holding element includes at least one contact strip integrally formed on the sheet metal element, wherein the at least one contact strip protrudes into the receiving opening and abuts against the heating element casing under resilient preload.

14. A method for the manufacture of an electric heating device in which first a housing having a partition wall which separates a connection chamber from a heating chamber for dissipating heat, and in which at least one PTC heating element with at least one heating element casing are manufactured, in which heating element casing at least one PTC heating element and conductor tracks are supported in an insulated manner, with the conductor tracks being arranged for energizing the PTC element with different polarities, and with the conductor tracks being connected to the PTC element in an electrically conductive manner, the method comprising:

introducing the PTC heating element into a heating element receptacle of the partition wall so that the heating element protrudes from the partition wall in a direction towards the heating chamber;

pushing a holding element, interacting with the heating element casing, over the heating element casing; and connecting the holding element to the partition wall on side thereof facing the heating chamber;

wherein the holding element includes a plurality of contact strips protruding on oppositely disposed longitudinal sides of a receiving opening of the holding element.

15. The electric heating device according to claim 13, wherein the at least one contact strip includes a plurality of contact strips protruding on oppositely disposed longitudinal sides of the receiving opening.

* * * * *